United States Patent
Bladen et al.

(10) Patent No.: US 9,215,862 B2
(45) Date of Patent: Dec. 22, 2015

(54) ANIMAL TAG APPLICATOR

(75) Inventors: Roy Victor Bladen, Auckland (NZ); Michael Stuart Gardner, Auckland (NZ)

(73) Assignee: DATAMARS SA, Bedano-Lugano (CH)

( * ) Notice: Subject to any disclaimer, the term of this patent is extended or adjusted under 35 U.S.C. 154(b) by 0 days.

(21) Appl. No.: 13/575,467

(22) PCT Filed: Jan. 26, 2011

(86) PCT No.: PCT/NZ2011/000005
§ 371 (c)(1),
(2), (4) Date: Jul. 26, 2012

(87) PCT Pub. No.: WO2011/093726
PCT Pub. Date: Aug. 4, 2011

(65) Prior Publication Data
US 2013/0006263 A1   Jan. 3, 2013

(30) Foreign Application Priority Data

Jan. 27, 2010   (NZ) ........................................ 582984

(51) Int. Cl.
*A01K 11/00* (2006.01)
(52) U.S. Cl.
CPC .................................... *A01K 11/002* (2013.01)
(58) Field of Classification Search
CPC . A01K 11/002; A01K 11/006; A01K 11/001; A44C 7/001; A44C 7/00
USPC ......... 606/117, 188, 116, 184, 185, 205–209; 411/378–426; 76/64, 69; 81/3.6, 300; 294/3; 7/125–137; 433/4, 159; 140/121
See application file for complete search history.

(56) References Cited

U.S. PATENT DOCUMENTS

| | | | | |
|---|---|---|---|---|
| 2,420,020 A | * | 5/1947 | Snell | 81/377 |
| 3,208,319 A | * | 9/1965 | Westby et al. | 81/367 |
| 3,596,541 A | * | 8/1971 | Bieganski | 81/9.43 |
| 3,884,100 A | * | 5/1975 | Fideldy | 81/367 |
| 4,120,303 A | | 10/1978 | Villa-Massone et al. | |
| 4,516,577 A | * | 5/1985 | Scott et al. | 606/117 |
| 4,672,966 A | * | 6/1987 | Haas, Jr. | 606/117 |
| 5,267,464 A | * | 12/1993 | Cleland | 72/409.12 |
| 5,419,667 A | * | 5/1995 | Avgoustis | 411/386 |
| 6,235,036 B1 | | 5/2001 | Gardner et al. | |
| 7,134,365 B2 | * | 11/2006 | Hile | 81/368 |

(Continued)

FOREIGN PATENT DOCUMENTS

| | | |
|---|---|---|
| GB | 641394 | 8/1950 |
| WO | WO98/22028 | 5/1998 |

OTHER PUBLICATIONS

Ronish Chaudhary, WIPO Search Report, May 9, 2011, pp. 1-3, WIPO Australian Patent Office.

(Continued)

*Primary Examiner* — Christopher L Templeton
(74) *Attorney, Agent, or Firm* — Henricks, Slavin & Holmes LLP

(57) ABSTRACT

An applicator (1) has handles (2, 4) which on closing together will engage an animal tag with the animal's ear but at which time a control member (28) will engage with a linkage (6) to trip the linkage (6) into a jaw-open position. Once the handles (2, 4) have been released the linkage (6) will again be returned to its normal position primarily under the bias of a spring (25).

10 Claims, 9 Drawing Sheets

(56) References Cited

U.S. PATENT DOCUMENTS

| | | |
|---|---|---|
| 8,177,445 B2 | 5/2012 | Jones et al. |
| 2007/0044317 A1* | 3/2007 | Critelli .................... 30/173 |
| 2007/0283791 A1* | 12/2007 | Engvall et al. .............. 81/367 |
| 2008/0228105 A1 | 9/2008 | Howell et al. |

OTHER PUBLICATIONS

Chaudhary, Ronish, Written Opinion of the International Search Authority, May 9, 2011, 6 pages, PCT/ISA Australian Patent Office.

Mechanisms—Overcenter Linkage, www.daerospace.com/MechanicalSystems/OvercenterLinkage.php, printed from Internet on Jul. 10, 2013, 1 page.

* cited by examiner

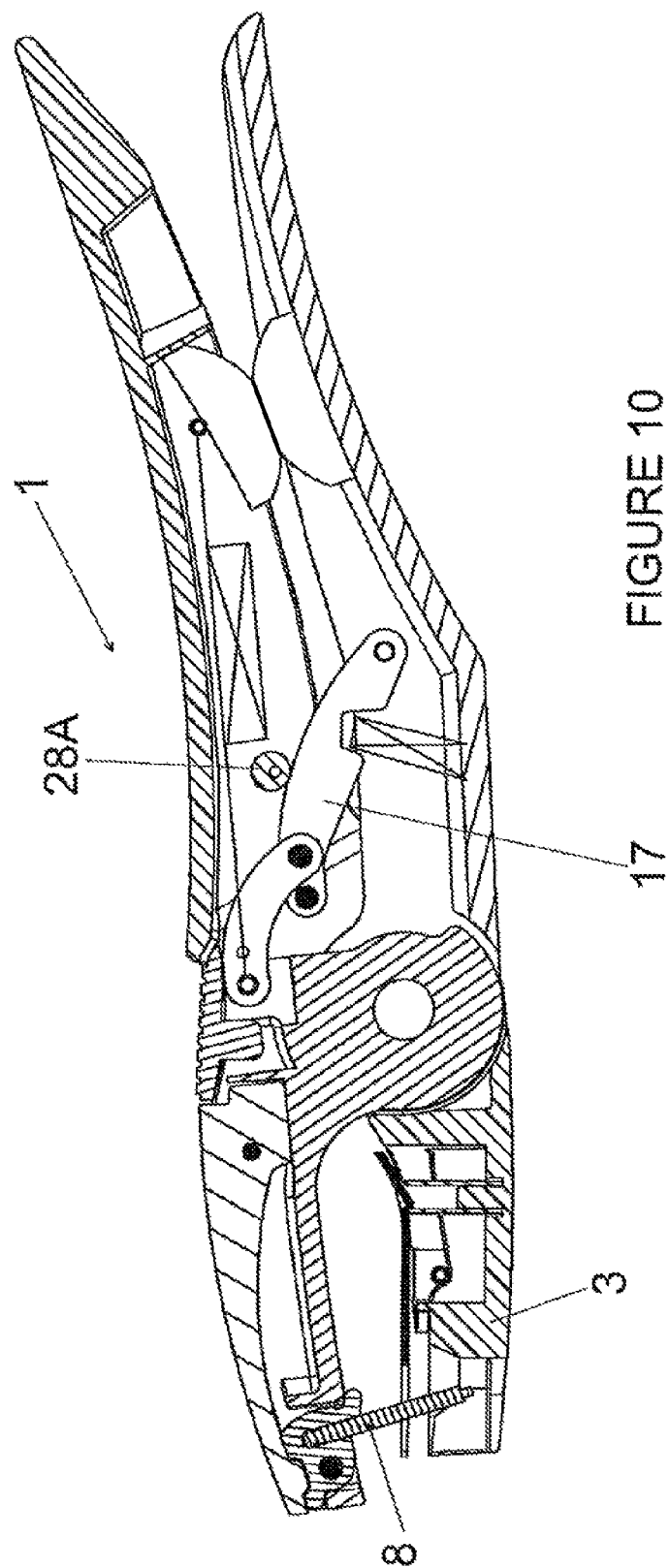

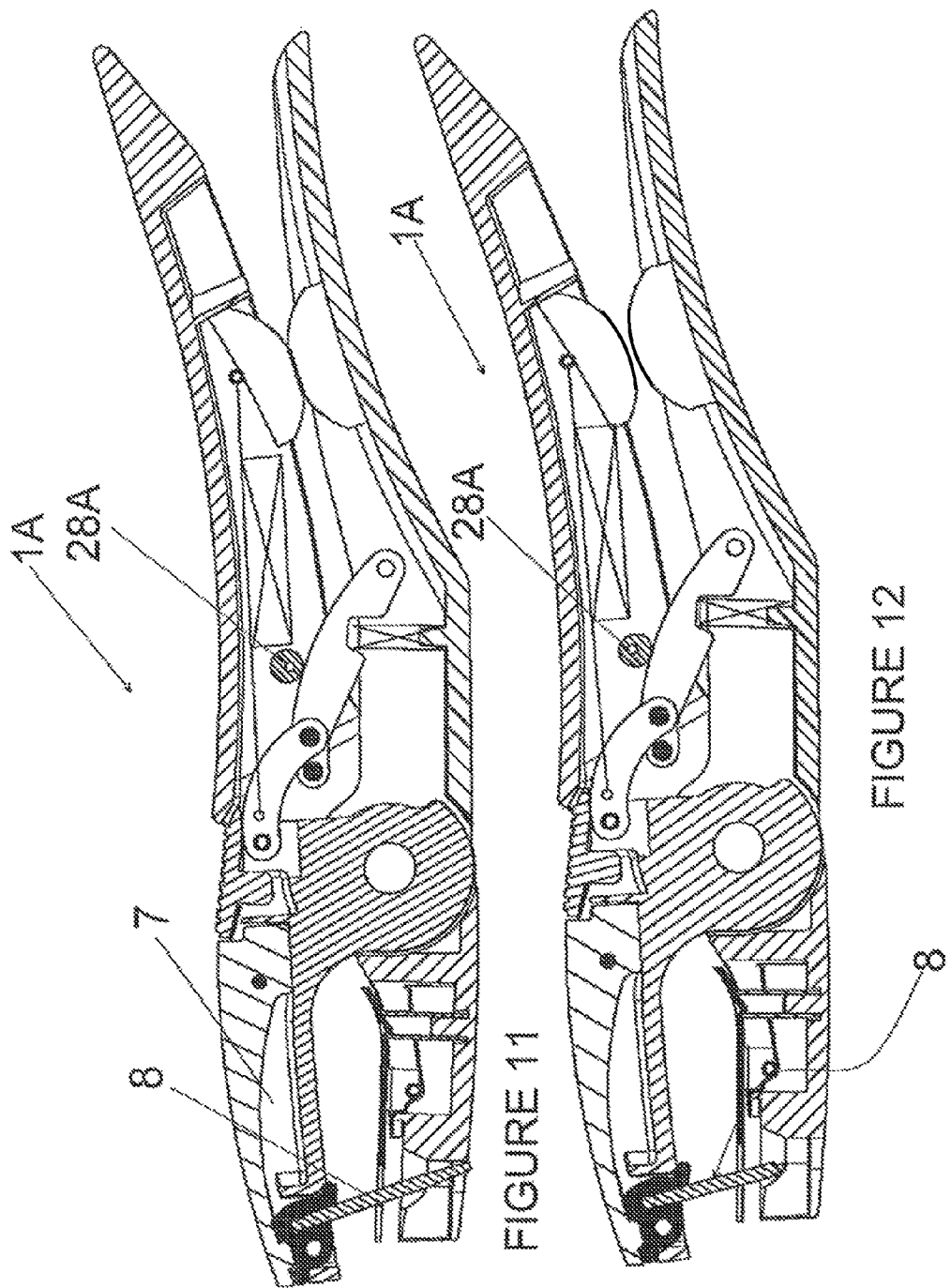

US 9,215,862 B2

ANIMAL TAG APPLICATOR

CROSS REFERENCE TO RELATED APPLICATIONS

This application is a National Stage of International Application No. PCT/NZ2011/000005, filed Jan. 26, 2011 (WO2011/093726), which claims priority to NZ582984 filed Jan. 27, 2010, the content of all of which are incorporated herein by reference.

BACKGROUND OF THE INVENTION

The present invention relates to an animal tag applicator which enables the application of identification tags, typically ear tags, to animals such as cattle and the like.

The most basic form of applicator operates in a similar manner to that of pliers. Such basic applicators present a problem in that damage can be caused to the animal's ear if the animal should move while tagging is taking place.

Various proposals have been put forward whereby, once the animal is tagged, the jaws of the applicator are immediately opened so that the animal can pull its ear away from the applicator without tearing occurring. Applicators may also include the ability for the applicator pin to be pivoted forwardly, which again assists in the animal's ear being released without damage.

In providing for the automatic release of the applicator jaws following tagging, some form of triggering mechanism is required. Because of the large number of tagging operations which an applicator needs to perform, substantial wear can occur on the triggering mechanism, which can result in its malfunctioning. In an earlier New Zealand patent no. 335702, of which the present applicant is the beneficial owner, and the complete specification of which is incorporated herein in its entirety by way of reference where appropriate, the automatic jaw opening mechanism is provided in the form of a rotating latch which is held by a catch until, at the appropriate time, the catch is released, enabling the applicator jaws to open. Although the latch and other components may be of a hardened material, this latch/catch mechanism may still be the subject of wear over a considerable number of tagging operations.

OBJECTS OF THE INVENTION

It is an object of the present invention in at least one embodiment to provide an animal tag applicator which will overcome, or at least alleviate, at least some of the disadvantages of existing applicators, or at least will provide the public with a useful choice.

SUMMARY OF THE INVENTION

According to one aspect of the present invention there is provided an animal tag applicator including:
 a first jaw portion to engage an animal tag, (or a part thereof);
 a second jaw portion;
 first and second handle portions pivotally connected together such that movement together of the first and second handle portions will cause the movement together of the first and second jaw portions;
 biasing means to bias said jaw portions to an open position;
 said first jaw portion being caused to move under the action of the biasing means to an open position independently of said handle portions but only after said animal tag, (or a part thereof), has fully engaged with an animal's ear;
 an over-center linkage means provided between one of said handle portions and one of said jaw portions which, in a first over-center position, enables the movement of said one jaw portion towards the other said jaw portion upon the movement of the handle portions together but, in a second over-center position, enables the said one jaw portion to be released into its open position.
 wherein said linkage means includes at least a pair of linkage members pivoted together and moveable from said first position to said second position and from said second position to said first position, through a center position;
 and wherein, a control means is moveable with an other said handle portion to be engageable with said linkage means, to move said linkage means from said first position through said center position.

Preferably, the control means includes a transverse pin engageable with an upper surface of the linkage means.

Optionally, said control means includes a cam means.

According to a further aspect of the present invention, an animal tag applicator is substantially as herein described with reference to any one of the embodiments and as illustrated in any one or more of the accompanying drawings.

Further aspects of this invention, which should be considered in all its novel aspects, will become apparent from the following description.

BRIEF DESCRIPTION OF THE DRAWINGS

FIG. 10: shows the embodiment of FIG. 9 but with an alternative control setting;
FIG. 11: shows diagrammatically a cross-sectional view of a further possible embodiment of the invention, particularly for use with one-piece tags;
and
FIG. 12: shows diagrammatically a cross-sectional view of a still further possible embodiment of the invention, for use with two-piece tags.

DESCRIPTION OF POSSIBLE EMBODIMENTS

Figure 1:
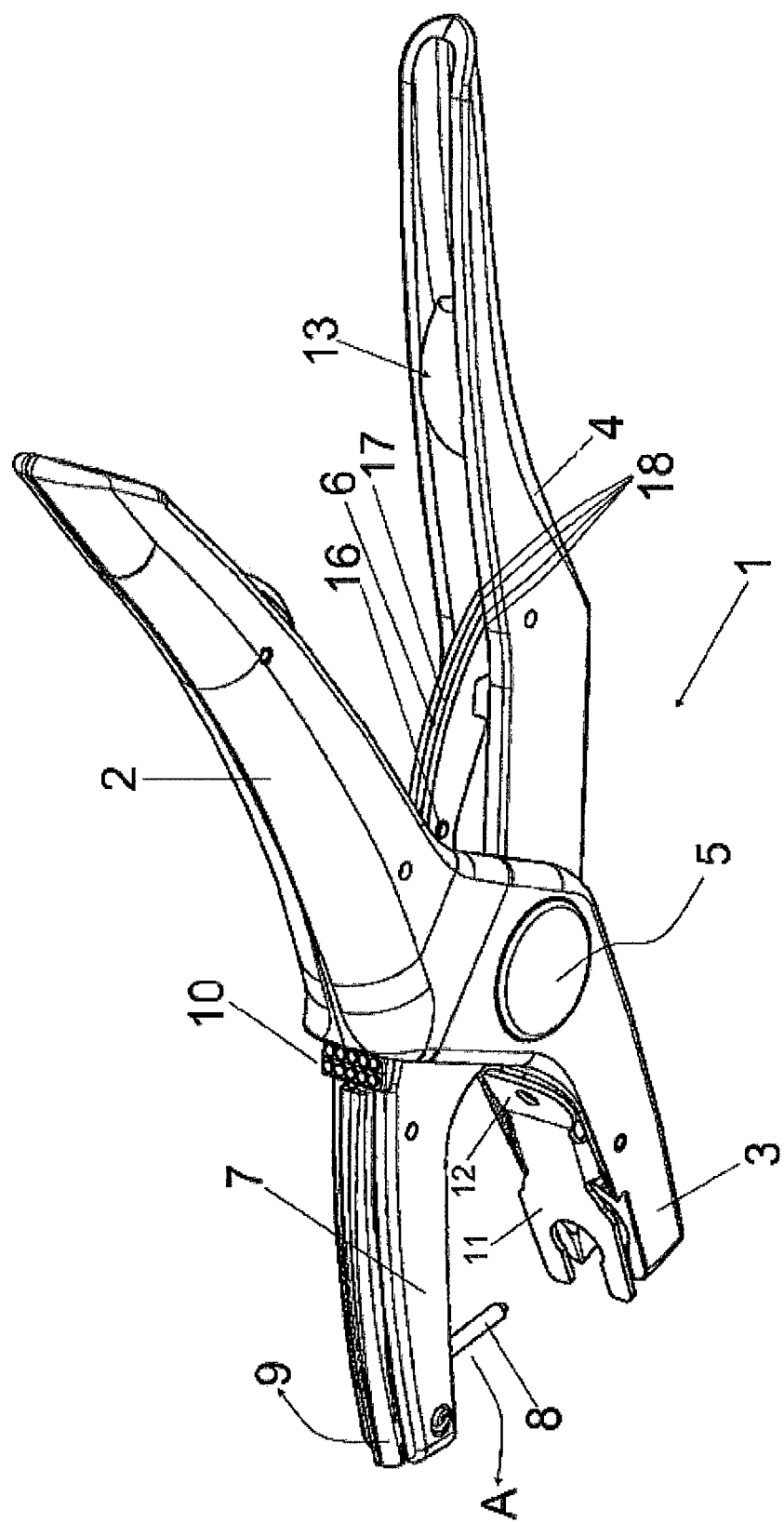
FIG. 1: shows a rear perspective view of one possible embodiment of the present invention and in its open position.
Figure 2:
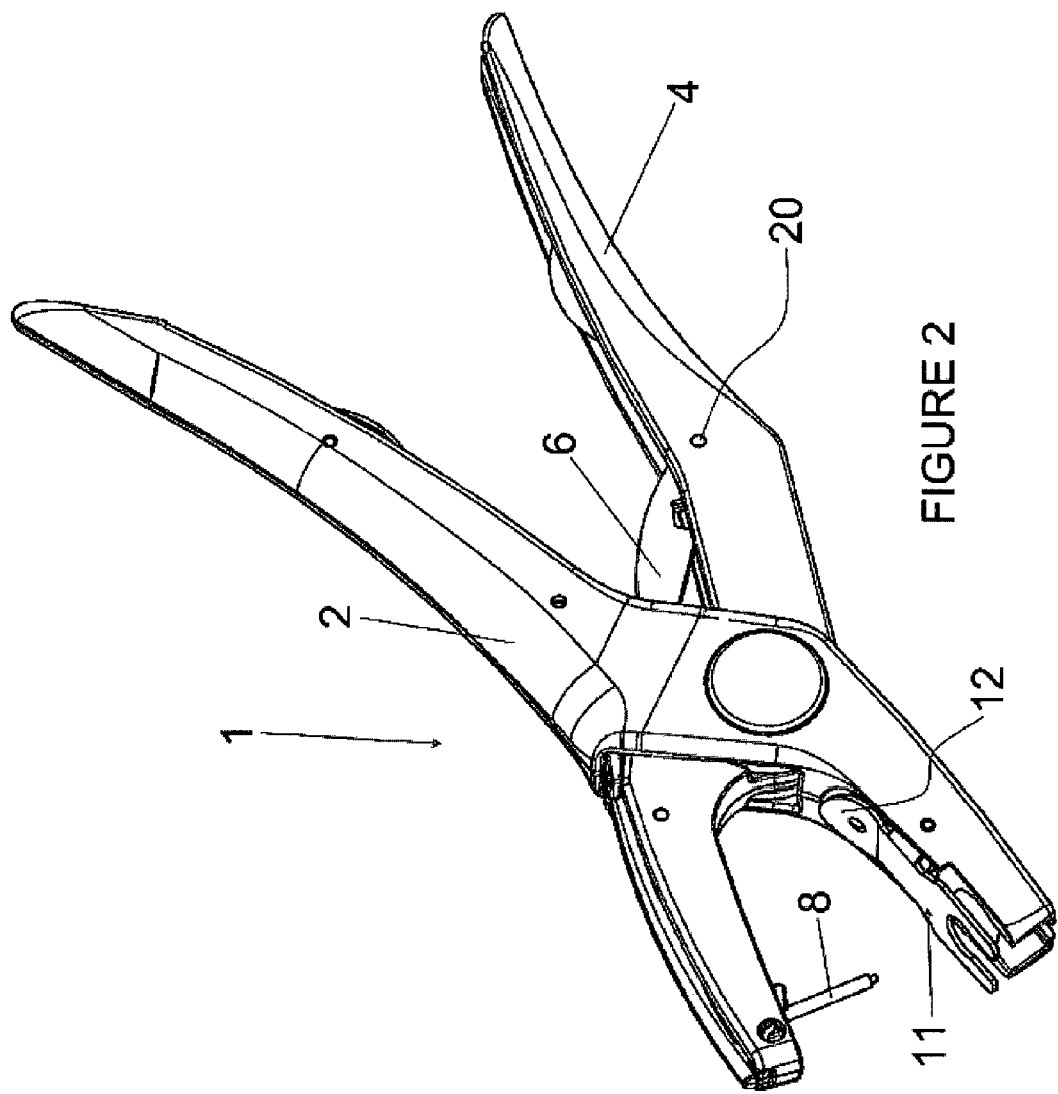
FIG. 2: shows a front perspective view of FIG. 1.
Figure 3:
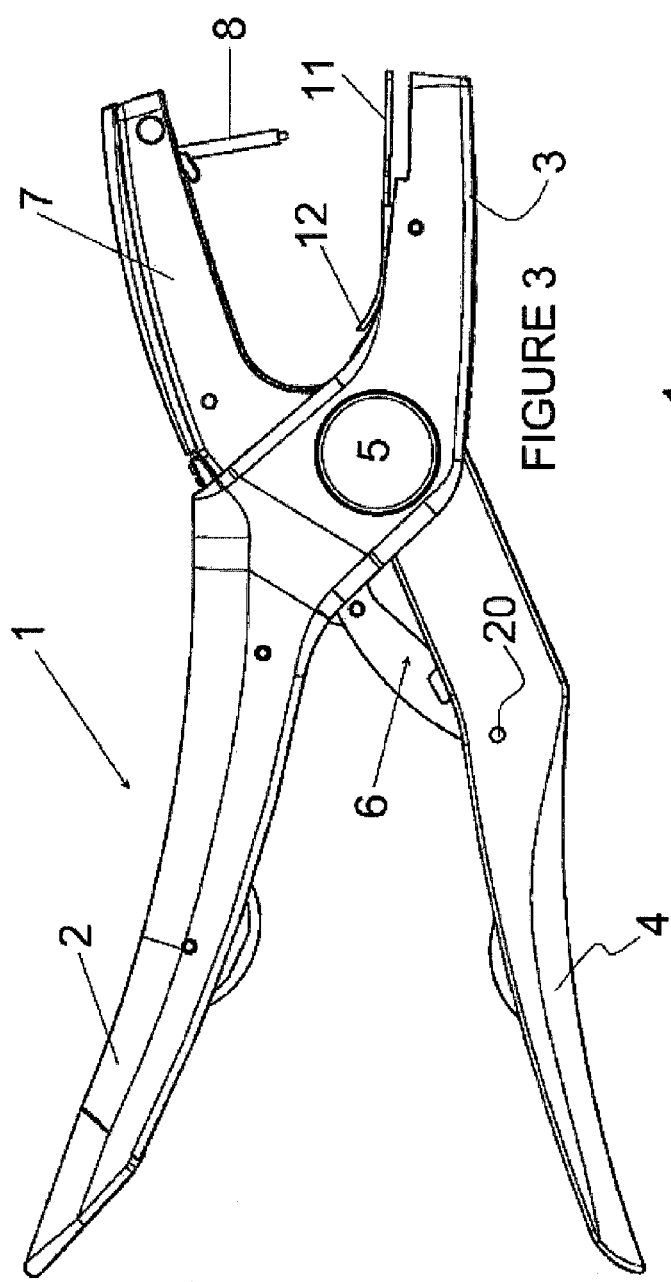
FIGS. 3, 4 and 5: show respectively side, underneath and end views of FIG. 1.
Figure 5:
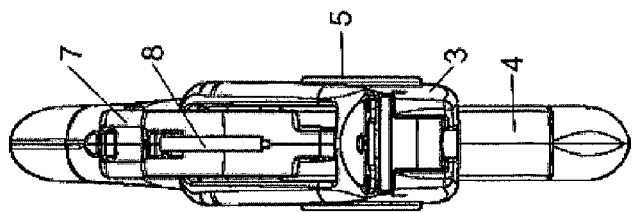
Figure 4:
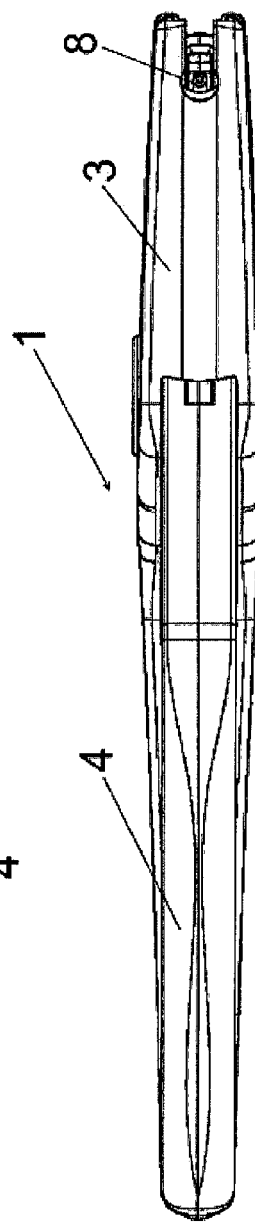

Referring to FIGS. 1 to 8, an animal tag applicator is referenced generally by arrow 1 and is shown with a first handle portion 2 which extends to a first jaw portion 3. A second handle portion 4 is pivoted at 5 with the handle portion 2 and a linkage 6, to be described in detail below, connects the handle portion 4 with a second jaw portion 7. The jaw portion 7 is shown with a downwardly depending pin 8 which in use can accommodate in known manner a male tag of a two-piece tag (not shown). The pin 8 may typically have the ability to pivot forwardly in the direction indicated by arrow A, to facilitate loading of the male tag but also to facilitate the animal pulling away from the applicator 1 following the tagging operation. A biasing means 9 will typically bias the pin 8 into its downwardly directed position. Pin 8 (see FIG. 3 for example) may typically be angled relative to the jaw 7 such that with the radial movement of the jaw 7, the pin 8 will then be at a substantially 90° angle relative to the second jaw 3 as the male tag engages with the animal's ear, the pin 8 then moving beyond the substantially 90° position before the jaw 7 is released into its open position as will be described later. A shock absorbing means 10 may be provided between the top of the jaw 7 and the forward edge of the handle portion 2 so as to absorb the impact of the jaw 7 on the handle portion 2 as the jaw 7 opens.

In this particular embodiment a spring loaded plate 11 may be pivoted upwardly, by depression of its end section 12, to enable a female tag to be positioned underneath the plate 11, ready to receive the male tag during the tagging operation. Abutments 13 are shown provided for the respective handle portions 2 and 4. The abutments 13 may suitably be of a hard plastics or the like and are adapted to abut together when the handle portions 2 and 4 are closed together (see FIGS. 7 and 8 for example).

The linkage 6 may suitably include, as shown, (see for example FIG. 6), a first linkage 15 pivotally connected at 16 to a second linkage 17. As seen particularly from FIG. 1, the second linkage 17 may suitably include a pair of arms 18 between which the first linkage 15 can be sandwiched, with the pivot 16 extending through both arms 18 and with the linkage 15 between them. The arms 18 can be secured together at their forward ends by a pin or the like 19, also acting as a stop (as described below), and be pivotally mounted in position on the handle portion 4 by means of pivot 20. The linkage 15 is connected at its forward end 21 with a spring 22, the other end of the spring 22 being connected at 23 with the handle portion 2.

Figure 6:
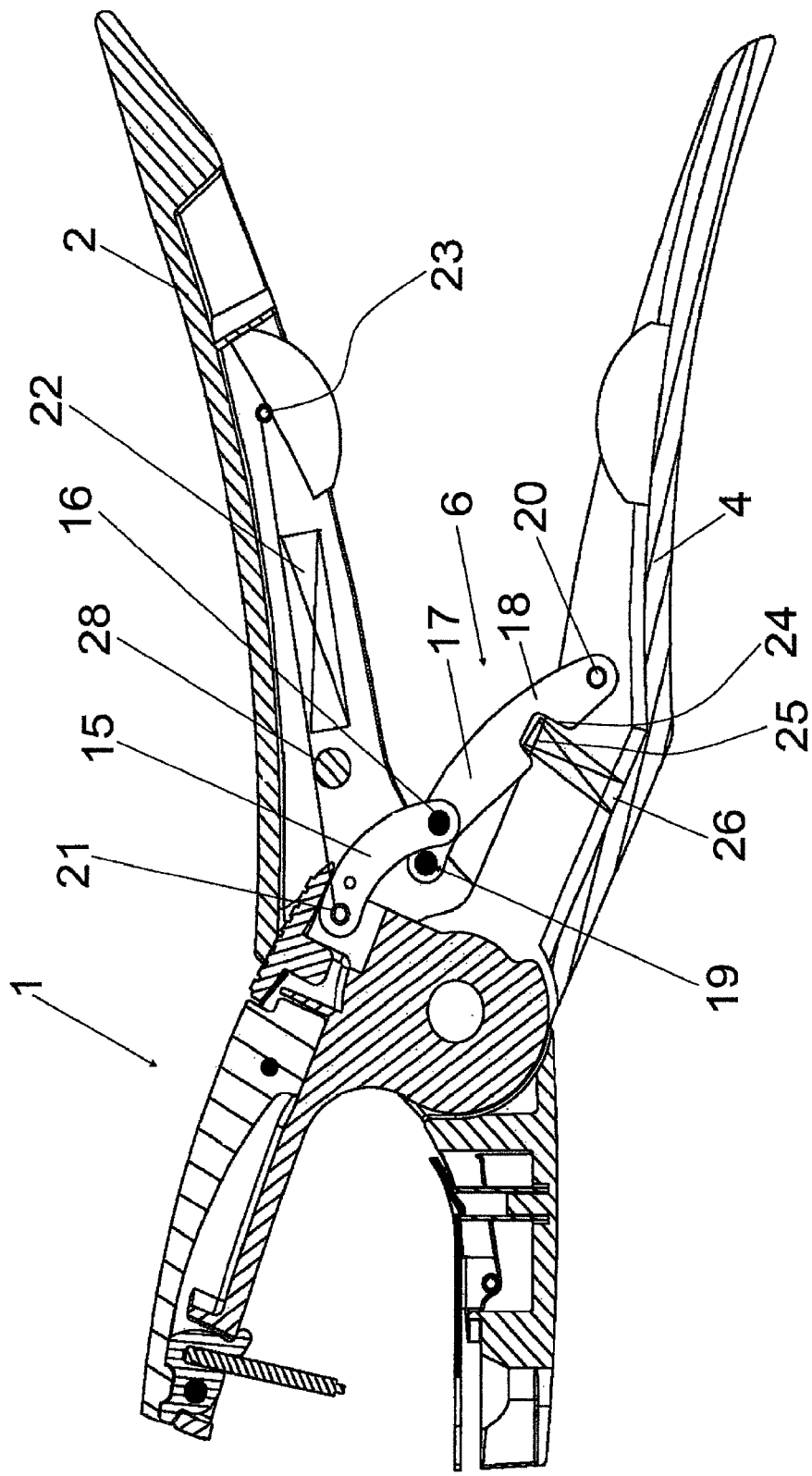
FIG. 6: shows diagrammatically a cross-sectional view of FIG. 1.

The linkage arms 18 are each shown having a recess 24 which can accommodate an upper end of a biasing means 25, the opposite end of which 26 is shown positioned against an inner surface of the handle portion 4 (see FIG. 6 for example). The biasing means 22 and 25, which may be of any suitable type, are adapted so as to bias the linkage 6 into the position shown in FIG. 6 and with the linkage members 15 and 17 extending away from one another, in which position the jaws 3 and 7 and the handle portions 2 and 4 are in their open position. In this position, the spring 25 and the spring 22 are holding the linkage 6 slightly over center against stop 19. At this time, the male and female tags (not shown) will be loaded onto the applicator pin 8 and beneath the plate 11 respectively, and the applicator 1 positioned with the jaws 3 and 7 around an animal's ear. The user will then squeeze the handle portions 2 and 4 together so that the applicator pin 8 is in the position shown in FIG. 7 and the male and female tags have engaged and are secured through the animal's ear. With the squeezing together of the handle portions 2 and 4, a control member 28, suitably a transverse pin or the like, provided on the handle portion 2 has moved so as to engage with the upper, suitably arcuate, surface of the linkage 17, forcing the arms 18 downwardly as they pivot, from the initial over-centre position, about the pivot 16 relative to the linkage 15. When the linkages 15 and 17 reach a center position, with the handle portions 2 and 4 still compressed together, the linkage 6 will trigger or "trip" due to the action of spring 22 so as to assume the second over-center position shown in FIG. 8, resulting in the automatic opening of the jaw 7 relative to the jaw 3.

When the pressure on the handle portions 2 and 4 is released, however, the bias created by the biasing means 25, will force the linkage 6 back to its original position, as shown in FIG. 6 for example, so that the applicator 1 is once again ready for the loading of the next male and female tags and the next tagging operation.

Figure 7:
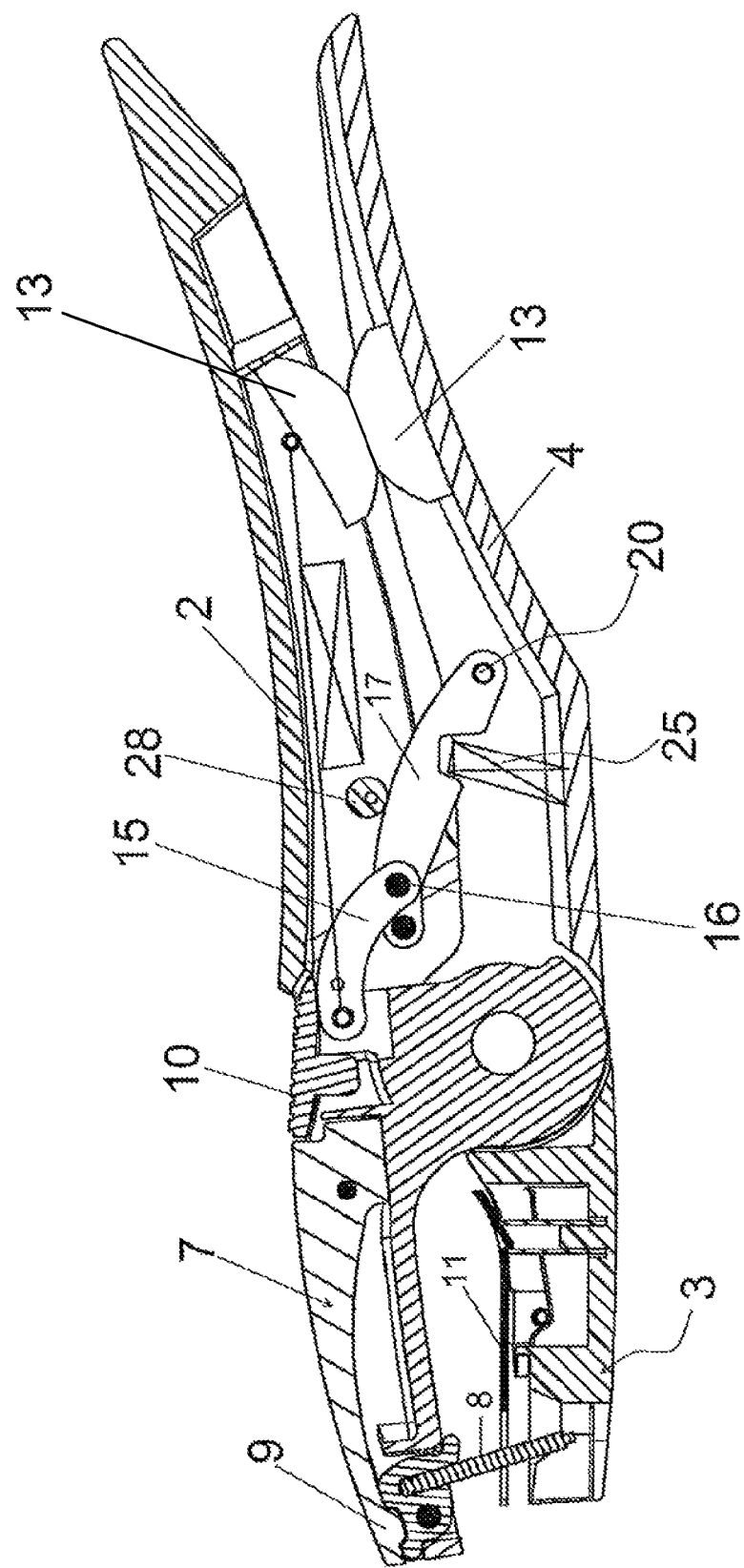
FIG. 7: shows diagrammatically a cross-sectional view of FIG. 1 as a tagging operation is completed.
Figure 8:
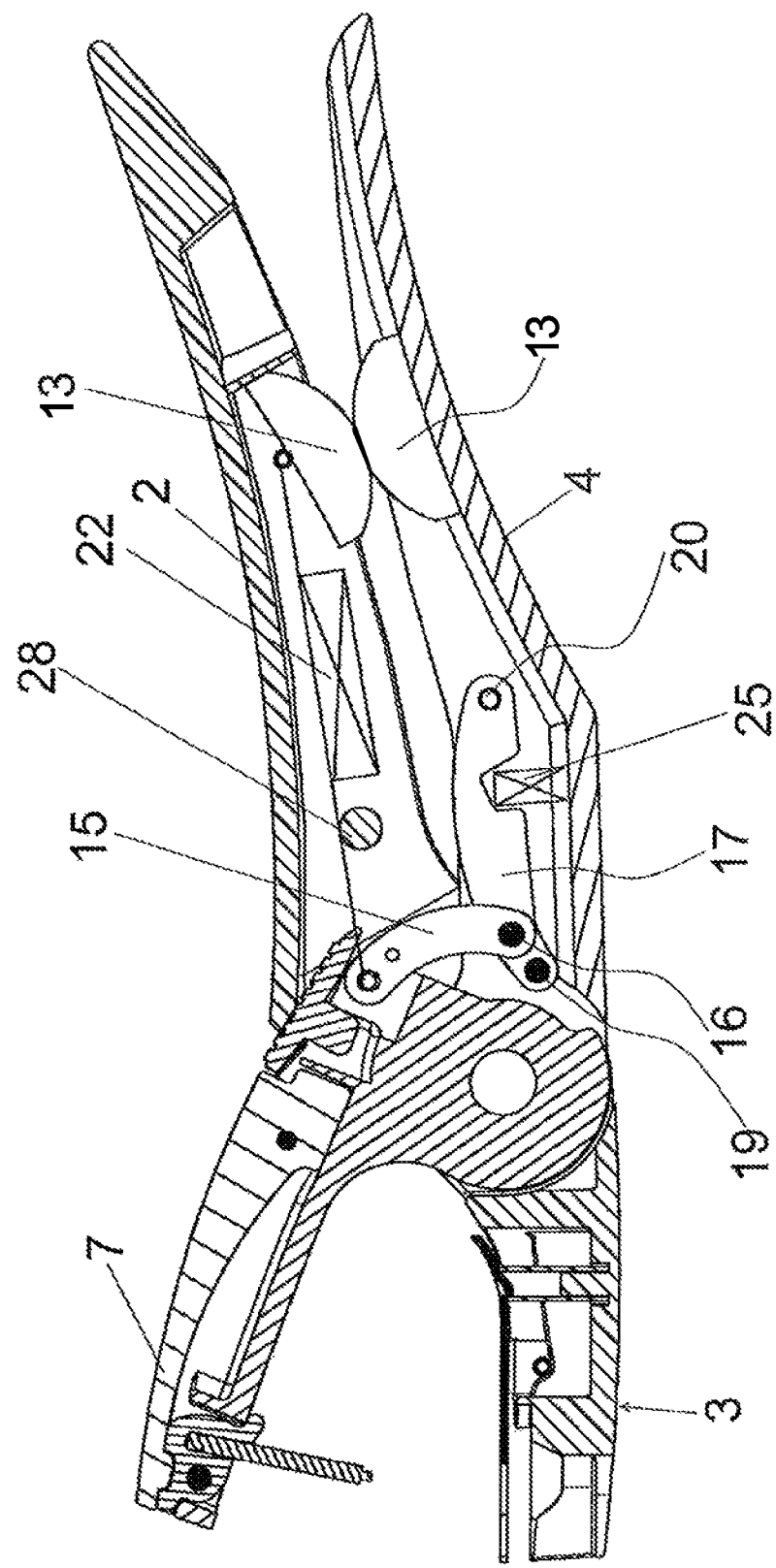
FIG. 8: shows diagrammatically across-sectional view of FIG. 1 following the completion of the tagging operation.

As will be seen in FIG. 7, the applicator pin 8 has reached a particular depth relative to the jaw 3, which in use would relate to a suitable depth of engagement for a male tag with the female tag.

Figure 9:
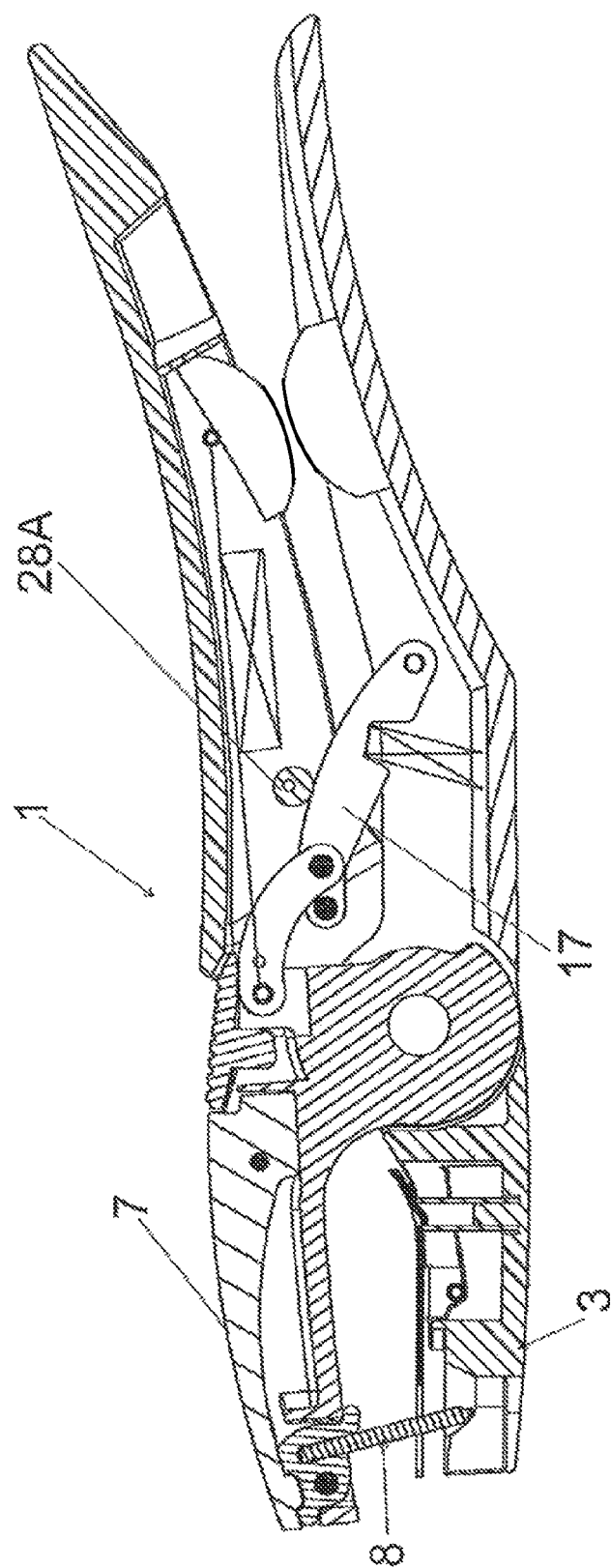
FIG. 9: shows diagrammatically a cross-sectional view of a second possible embodiment of the invention and as a tagging operation is completed.

It may, however, be necessary or desirable for that depth of engagement to be adjustable. Referring to FIGS. 9 and 10, it is seen in this alternative embodiment that an eccentric cam 28A, by its disposition relative to the linkage, may make such adjustment possible. It is seen that in providing an eccentric cam 28A, the timing of its engagement with the upper surface of the linkage 17 may be controlled. This in turn may control the extent to which the pin 8 moves relative to the jaw 3 before the jaws 3 and 7 are automatically opened. It is envisaged that the cam 28A could, for example, be pre-set to have just a set number of positions or may be totally variable by rotation about the cam pivot.

Referring now to FIG. 11, in an alternative embodiment of the present invention, an applicator 1A may be particularly suitable for use with one piece tags and for this purpose is shown with a longer applicator pin 8 and suitably with a more acute angle relative to the jaw 7 in the jaw-closed position. Depending on the one piece tag being utilised, other options for the applicator pin 8, and other components of the applicator 1A, may be appropriate.

In the particular embodiment shown in FIG. 11 an adjustable cam 28A is shown provided to control the depth of engagement of the pin 8, although a standard operating pin 28, such as that of FIG. 7, may be utilised instead. Turning then to FIG. 12, in a modification of FIG. 11, the adjustment of the cam 28A has allowed the use of a shorter pin 8 with less engagement, and as suitable for a two-piece tag.

Where in the foregoing description, reference has been made to specific components or integers of the invention having known equivalents then such equivalents are herein incorporated as if individually set forth.

Although this invention has been described by way of example and with reference to possible embodiments thereof, it is to be understood that modifications and/or improvements may be made thereto without departing from the scope of the invention as defined in the appended claims.

The invention claimed is:

1. An animal tag applicator including:
    a first jaw portion to engage at least a part of an animal tag;
    a second jaw portion;
    first and second handle portions pivotally connected together such that movement of the handle portions towards each other will cause movement of the first and second jaw portions towards each other;
    a biasing member to bias said first jaw portion to an open position;
    said first jaw portion being caused to move by the biasing member to the open position only after said animal tag has engaged and secured to an animal's ear;
    an over-center linkage means provided between said first handle portion and said first jaw portion which, in a first over-center position, enables the movement of said first jaw portion towards said second jaw portion upon the movement of the handle portions towards each other, but in a second over-center position, enables said first jaw portion to be released into said open position;
    wherein said over-center linkage means includes at least a pair of linkage members pivoted together and moveable from said first over-center position to said second overcenter position and from said second over-center position to said first over-center position through a center position;

wherein a control means is moveable with said second handle portion to be engageable with said over-center linkage means, to move said over-center linkage means from said first over-center position through said center position to said second over-center position, the control means being so positioned on said second handle portion relative to the over-center linkage means that the control means will engage with the over-center linkage means to move the over-center linkage means to said second over-center position and to enable the first jaw portion to open, only when said first and said second handle portions have moved closer together;

wherein said biasing member includes a spring having a spring end portion connected with an end of said over-center linkage means, and wherein an opposite end of said spring is connected with said second handle portion to bias and trigger opening of the first jaw portion to said open position after the over-center linkage means is in said second over-center position.

2. The animal tag applicator as claimed in claim 1 wherein said control means includes a transverse pin engageable with an upper surface of the over-center linkage means.

3. The animal tag applicator as claimed in claim 1 wherein said control means includes a cam means.

4. The animal tag applicator as claimed in claim 3 wherein said cam means is an eccentric cam; wherein a position of the eccentric cam relative to the over-center linkage means can control the engagement of the animal tag with the animal's ear.

5. The animal tag applicator as claimed in claim 1 wherein a second spring member extends between said over-center linkage means and said first handle portion to bias said over-center linkage means to return to the first over-center position upon release of the handle portions.

6. The animal tag applicator as claimed in claim 1 wherein said control means is rotatable on the second handle portion.

7. The animal tag applicator as claimed in claim 1 wherein a second linkage member of the at least a pair of linkage members is mounted to the first handle portion; wherein said control means is positioned on the second handle portion so as to contact the second linkage member when the first and second handle portions move towards each other.

8. The animal tag applicator as claimed in claim 1 wherein a second linkage member of the at least a pair of linkage members includes a pair of arms having respective first ends coupled to the first handle portion and respective second ends coupled together with a stop pin.

9. The animal tag applicator as claimed in claim 8 wherein the stop pin is configured to contact a first linkage member of the at least a pair of linkage members, and wherein the first linkage member is sandwiched between the pair of arms.

10. The animal tag applicator as claimed in claim 9 wherein a second spring member is configured to bias the stop pin against the first linkage member.

\* \* \* \* \*